Nov. 19, 1957  C. O. POPPLE  2,813,478
BARBECUE MACHINE
Filed Oct. 19, 1956  2 Sheets-Sheet 1

INVENTOR.
CHARLES O. POPPLE,
BY
McMorrow, Berman + Davidson
ATTORNEYS.

Nov. 19, 1957 C. O. POPPLE 2,813,478
BARBECUE MACHINE
Filed Oct. 19, 1956 2 Sheets-Sheet 2
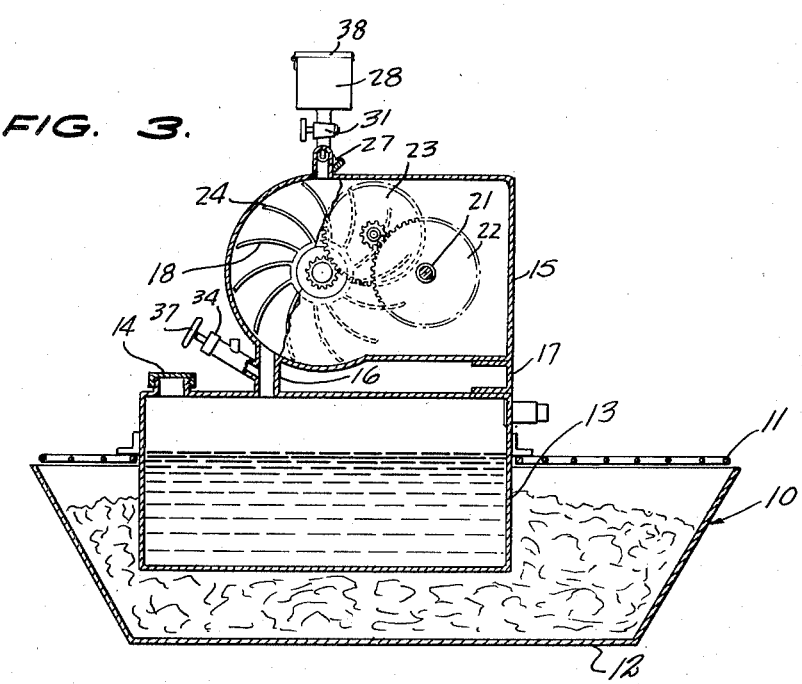
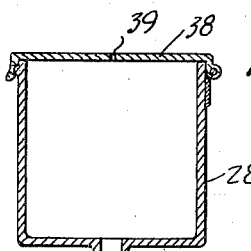
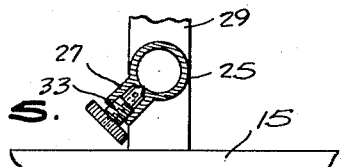
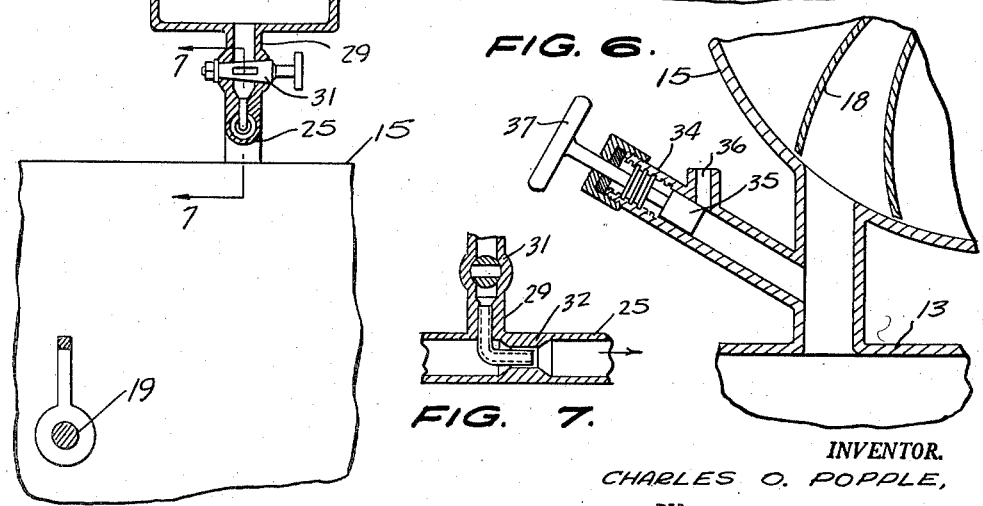
INVENTOR.
CHARLES O. POPPLE,
BY
McMorrow, Berman + Davidson
ATTORNEYS.

United States Patent Office 2,813,478
Patented Nov. 19, 1957

2,813,478

BARBECUE MACHINE

Charles O. Popple, Coventry, Conn.

Application October 19, 1956, Serial No. 617,167

3 Claims. (Cl. 99—346)

The present invention relates to barbecue machines of the type having rotating spits.

An object of the present invention is to provide a barbecue machine having a rotating spit for supporting food to be cooked, one which lends itself to the proper and tasteful cooking of meats and other foods and avoiding the excessive drying out of such foods by the automatic application of a basting liquid thereto, one which has self-contained means for rotating the spit, one which is automatic in operation and of simple structure, economical to manufacture and assemble, and one which is highly effective in action.

These and other objects and advantages of the present invention will be fully apparent from the following description when taken in connection with the annexed drawings, in which:

Figure 3 is a sectional view taken on the line 3—3 of Figure 2;

Figure 4 is a sectional view, on an enlarged scale, taken on the line 4—4 of Figure 2;

Figure 5 is a sectional view, on an enlarged scale, taken on the line 5—5 of Figure 2;

Figure 6 is a sectional view, on an enlarged scale, taken on the line 6—6 of Figure 1; and Figure 7 is a sectional view, on an enlarged scale, taken on the line 7—7 of Figure 4.

Figure 2:
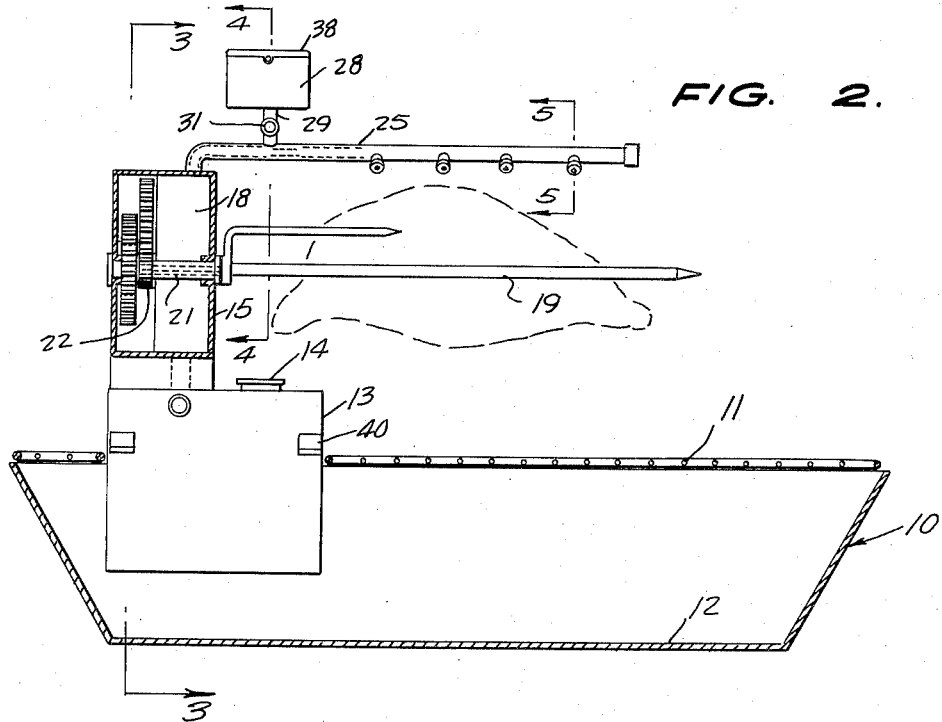
Figure 2 is a sectional view taken on the line 2—2 of Figure 1.

Referring in greater detail to the drawings in which like numerals indicate like parts throughout the several views, the barbecue machine of the present invention comprises a fire box 10 having a grill 11 extending over the open top of the fire box 10 and spaced from the bottom 12 of the fire box 10. The grill 11 is provided with an opening adjacent one end thereof for the insertion and support of a closed receptacle 13 having a filler cap 14 for the admission thereto of water or other liquid.

Another receptacle 15, constituting a turbine wheel compartment and steam chest, is positioned in superimposed spaced relation above the receptacle 13 and is supported thereon by means of an upright pipe 16 and a U-shaped bracket 17. The pipe 16 connects the interior of the receptacle 13 with the interior of the receptacle 15 and is so positioned with respect to the receptacle 15 so as to direct a flow of steam to the curved sides of the blades 18 of a turbine wheel which is journaled in the walls of the receptacle 15 for rotation about a horizontal axis.

A spit 19, disposed horizontally, is positioned exteriorly of and on one side of the receptacle 15 and has a shank portion 21 extending within the receptacle 15 and carrying a gear 22. An intermediate double gear 23 is mounted upon a stub shaft and is in mesh with a gear on the turbine assembly 24 and also with the gear 22 for imparting rotational movement at a reduced speed to the gear 22 upon execution of rotary movement of the turbine assembly 24 in response to the reaction of the blades 18, upon admission of steam into the receptacle 15 from the receptacle 13.

A conduit 25, having one end closed by a cap 26 and the other end opened, is positioned in superimposed spaced relation and longitudinally of the spit 19 and has its open end connected in communication with the receptacle 15. The conduit 25 is provided with a plurality of dispensing orifices 27 along its length inwardly of the closed end.

A receptacle for a quantity of basting liquid is positioned above and adjacent the conduit 25 and is supported on the conduit 25. Although the receptacle 28 is shown adjacent to and spaced from the conduit 25, it could be positioned in a place remote from the conduit 25 without departing from the spirit of the invention.

The receptacle 28 is in communication with the pipe 29 at one end of the latter, the other end of the pipe 29 connected in communication with the conduit 25 intermediate the end which is connected to the receptacle 15 and the orifices 27. A valve 31 in the pipe 29 controls the flow of the basting liquid from the receptacle 28 to the open end of the pipe 29.

Means is provided for drawing the basting liquid from the receptacle 28 into the conduit 25 and for mixing the basting liquid with steam and directing the steam-liquid mixture toward the orifices 27. Specifically, this means consists in a restricted passage in the portion of the conduit 25 adjacent the open end of the pipe 29. Referring to Figure 7, the restricted passage is formed by a second portion 32 of the wall of the conduit 25 and a short section on the lower end of the pipe 29 which, together with the adjacent portion 32 of the wall of the conduit, forms a restricted passage which, when steam is flowing through the conduit 25 in the direction of the arrow, results in a lowering of the pressure at the open end of the pipe 29 to cause a suction in the pipe 29 to draw the basting liquid out of the receptacle 28. This also results in the mixing of the steam with the basting liquid and the dispensing of the steam-liquid mixture out of the orifices 27 onto the food that is being cooked upon the spit 19.

Referring to Figure 5, one of the orifices is seen to have a needle valve assembly 33 for controlling the flow of the steam-liquid mixture therefrom.

In Figure 6 is shown a means by which the speed of rotation of the turbine assembly 24 is controlled and comprises a bleed-off valve assembly 34 having a movable plug 35 to cover and uncover a by-pass 36. Manipulation of the handle 37 of the bleed-off valve assembly 34 will permit more or less steam to escape from the by-pass 36 and thereby regulate the amount of steam which reaches the blades 18 of the turbine blade 24.

The receptacle 28 is closed by a cap 38 hingedly connected thereto and provided with a vent hole 39 for the admission of air into the receptacle 28 as the basting liquid is drawn out by the suction in the conduit 25.

Figure 1:
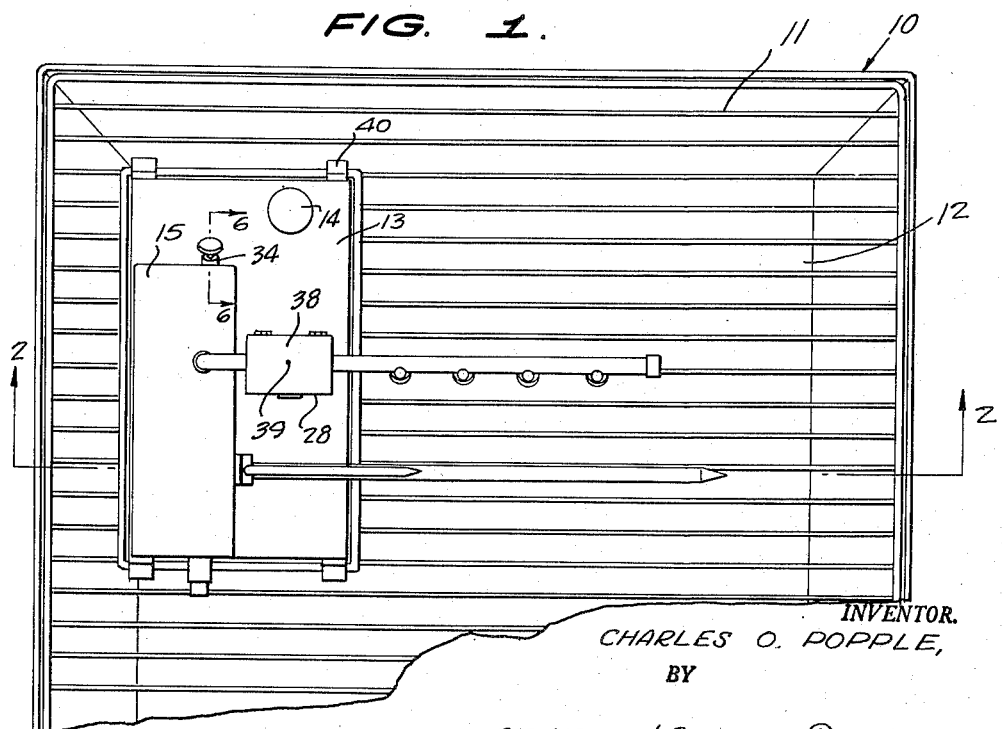
Figure 1 is a plan view of the barbecue machine of the present invention with a portion broken away.

The receptacle 13 is provided on each of its ends with outwardly extending lugs 40 which rest upon the adjacent portions of the grill 11 when the receptacle 13 is positioned, as shown in Figures 1 to 3, inclusive, within the hole provided in the grill 11.

In operation, the barbecue machine, according to the present invention, is charged with a quantity of fuel on the bottom 12 of the fire box 10 and as a result thereof steam is generated within the receptacle 13 and drives the turbine blades 18 to cause rotation of the spit 19. The exhaust steam passing through the conduit 25 causes a lowering of the pressure in the pipe 29 as a result of the restricted passageway and draws the basting liquid contained in the container 28 into the conduit 25 and mixes it with steam and then causes the steam and liquid mixture to be discharged through the orifices 27 upon the meat or other foods supported on the spit 19.

What is claimed is:

1. In a barbecue machine, the combination with a steam chest, a spit adapted to support a food to be cooked positioned exteriorly of and one side of said chest and connected to said chest for rotary movement, of a device for mixing a basting liquid with steam and dispensing the steam-liquid mixture onto food supported on said spit, said device comprising a conduit having one end closed and the other end open positioned in superimposed spaced relation and longitudinally of said spit and having its open end connected in communication with said chest, there being a dispensing orifice in said conduit inwardly of said closed end, a receptacle for a quantity of basting liquid positioned above and adjacent said conduit, a pipe having one end connected in communication with the interior of said receptacle and having the other end extending into said conduit intermediate said open end and said orifice, and means in said conduit adjacent said pipe other end for drawing basting liquid into said conduit from said pipe and mixing said liquid with steam and directing the steam-liquid mixture toward said orifice.

2. In a barbecue machine, the combination with a steam chest, a spit adapted to support a food to be cooked positioned exteriorly of and on one side of said chest and connected to said chest for rotary movement, of a device for mixing a basting liquid with steam and dispensing the steam-liquid mixture onto food supported on said spit, said device comprising a conduit having one end closed and the other end open positioned in superimposed spaced relation and longitudinally of said spit and having its open end connected in communication with said chest, there being a dispensing orifice in said conduit inwardly of said closed end, a receptacle for a quantity of basting liquid positioned above and adjacent said conduit, a pipe having one end connected in communication with the interior of said receptacle and having the other end extending into said conduit intermeidate said open end and said orifice, and means in said conduit adjacent said pipe other end for drawing basting liquid into said conduit from said pipe and mixing said liquid with steam and directing the steam-liquid mixture toward said orifice, said last-named means including a restricted passage in the portion of said conduit adjacent said pipe other end.

3. In a barbecue machine, the combination with a steam chest, a spit adapted to support a food to be cooked positioned exteriorly of and on one side of said chest and connected to said chest for rotary movement, of a device for mixing a basting liquid with steam and dispensing the steam-liquid mixture onto food supported on said spit, said device comprising a conduit having one end closed and the other end open positioned adjacent to and spaced from said spit and having its open end connected in communication with said chest, there being a dispensing orifice in said conduit inwardly of said closed end, a receptacle for a quantity of basting liquid positioned adjacent said conduit, a pipe having one end connected in communication with the interior of said receptacle and having the other end extending into said conduit intermediate said open end and said orifice, and means in said conduit adjacent said pipe other end for drawing basting liquid into said conduit from said pipe and mixing said liqud with steam and directing the steam-liquid mixture toward said orifice, said last-named means including a section of said pipe inwardly of said pipe other end positioned within said conduit with said other end facing said orifice and forming with the adjacent wall of said conduit a restricted passage.

No references cited.